United States Patent
Wagner et al.

(10) Patent No.: US 7,802,175 B2
(45) Date of Patent: Sep. 21, 2010

(54) AUTOMATED ADDRESS FORMATTING

(75) Inventors: Dirk P. Wagner, Schiffweiler (DE); Toralf Grossman, Wiesloch (DE)

(73) Assignee: SAP AG, Walldorf (DE)

( * ) Notice: Subject to any disclaimer, the term of this patent is extended or adjusted under 35 U.S.C. 154(b) by 1202 days.

(21) Appl. No.: 11/255,303

(22) Filed: Oct. 20, 2005

(65) Prior Publication Data

US 2007/0094593 A1 Apr. 26, 2007

(51) Int. Cl.
G06F 17/22 (2006.01)
G06F 17/24 (2006.01)

(52) U.S. Cl. ...................... 715/200; 715/703

(58) Field of Classification Search ............... 715/200, 715/703
See application file for complete search history.

(56) References Cited

U.S. PATENT DOCUMENTS

| | | | | |
|---|---|---|---|---|
| 5,805,810 | A * | 9/1998 | Maxwell | 709/206 |
| 6,604,132 | B1 * | 8/2003 | Hitt | 709/206 |
| 7,428,531 | B2 * | 9/2008 | Barron et al. | 707/4 |
| 2001/0034849 | A1 * | 10/2001 | Powers | 713/202 |
| 2003/0140047 | A1 * | 7/2003 | Edens et al. | 707/10 |
| 2005/0078658 | A1 * | 4/2005 | McLennan et al. | 370/352 |
| 2006/0059232 | A1 * | 3/2006 | Yoshikawa | 709/206 |
| 2007/0043846 | A1 * | 2/2007 | Grayson et al. | 709/223 |
| 2007/0061719 | A1 * | 3/2007 | Law | 715/700 |

OTHER PUBLICATIONS

Wang et al.,"Detecting Geographic Locations from Web Resources", ACM, 2005, pp. 17-24.*
Presotto, David, "Upas—a simpler approach to network mail", Google Scholar, 1985, pp. 1-6.*
Ahler et al,"Retrieving Address-based Location from the Web", 2008, ACM, pp. 27-34.*

* cited by examiner

*Primary Examiner*—Doug Hutton
*Assistant Examiner*—James J Debrow
(74) *Attorney, Agent, or Firm*—Kenyon & Kenyon LLP

(57) ABSTRACT

The automated insertion of formatted address information includes the generation of one or more electronic documents based on a document template having specific guidelines for the format of the address information. From this template, address information is inserted therein. Prior to insertion, an address format command is received which indicates which type of formatting is to be utilized. If a mailing format is utilized, the insertion of the address fields is performed relative to postal jurisdiction protocols. Otherwise, if a style format is used, the address fields are inserted based on the defined style, which may be associated with the template or specific through a user selection or automated selection. Furthermore, the user may define the applicable style for the address information in the electronic documents. Thereupon, these documents may be readily transmitted to the intended recipient with the user-selected address formatting.

21 Claims, 4 Drawing Sheets

AUTOMATED ADDRESS FORMATTING

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

The present invention relates generally to the automated generation of electronic documents and more specifically to the insertion and formatting of address data into the documents.

In customer resource management systems, it is typical to have customers with addresses in many different countries. Each of these countries has its own addressing guidelines relating to the formatting of the address information, as read and processed by the different postal departments. Therefore, the formatting of the address information on these electronic documents needs to be adjusted for the different countries.

In existing systems, address information is inserted into electronic templates having data field locations defined by postal guidelines. For example, if a document is created with an addressee in the United States, the recipient's name may be in the first line, the company name in the second line, third line is a street address and the fourth line is the city, state and zip. This would be consistent with the Post Office guidelines so the document may be properly delivered.

When a large number of documents are generated, such as in a mass mailing, the process is repeated for each document. Based on the defined postal guidelines, the address information for the different recipients is automatically formatted and inserted into the documents. When the recipients are in different countries, different templates or guidelines must be used to adjust the address information.

When a large project is executed, the documents that are generated therefore do not have uniform address fields when the addresses are to different countries with varying format requirements. Rather, these fields vary significantly based on the jurisdictional postal requirements. With the continued growth of electronic communication, the postal address is not as necessary. Fewer documents are being physically mailed and do not require the proper postal address. Rather, these documents are being transmitted via electronic means.

Even though these documents may be transmitted by electronic means, in a business environment it is proper to include the full formal address anyway. In a business scenario therefore, generated documents may not have a uniform design due to varying address formats. Currently it is problematic to generate multiple documents directed to various users at different locations where the documents have a standardized addressing format because of the addressing protocols that govern the document creation.

In existing database applications that electronically generate multiple documents having address fields for different customers in different countries, the address is formatted according to the postal guidelines. Existing systems do not allow for the electronic generation of multiple documents inserting address information from customer information databases in user-defined formatting that would be contrary to the postal format guidelines.

DETAILED DESCRIPTION

Through the reception of an address format command, electronically generated documents may be generated from a central processing system including different address formats. Based on the format command, the address data may be assembled in accordance with postal protocols or the address data may be assembled based on a user-defined format. From the processing system's perspective, the operations may occur in accordance with normal operations, where the address fields, upon being extracted from data fields, are assembled in varying orders in the multiple electronic documents.

Figure 1:
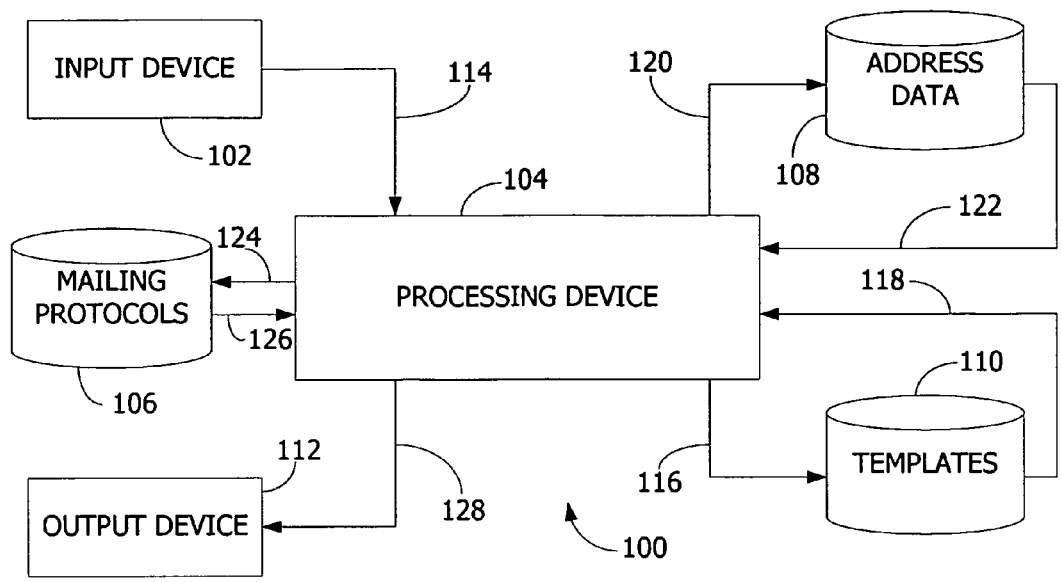
FIG. 1 illustrates a block diagram of one embodiment of an apparatus for automated insertion of formatted address information.

FIG. 1 illustrates a block diagram of one embodiment of an apparatus 100 that includes an input device 102, a processing device 104, a mailing protocol database 106, an address data database 108, an electronic document template database 110 and an output device 112. The processing device 104 may be executing a larger software application, such as a customer resource management application having further processing elements, such as connected across various network connections and interoperable with one or more databases that include further information, such as inventory or other customer information. It is also noted that, as recognized by one skilled in the art, many elements within the apparatus 100 operating within a large software operating system have been omitted for clarity purposes only.

In one embodiment, the input device 102 receives an input command, such as a mouse click or keyboard entry. This input provides for an indication of a user's preference for a type of formatting to be used in a document generation routine. In one example, a user may, through a larger software operating system, enter commands to generate an advertising campaign including generating a large number of electronic documents directed to one or more sets of customers. In the generation of this command, the user may be provided with a selection window asking the user to select a type of addressing format.

Through the input device, an address format command 114 is generated and provided to the processing device 104. In the generation of the advertising campaign, the processing device 104 generates and provides an extraction command 116 to the template database. In response thereto, a selected document template 118 is retrieved therefrom. In one embodiment, processing device 104 may provide for a user-based selection of a particular template, such as a through a graphical user interface or other selection technique, so the template may be used for generating multiple electronic documents. The template may be one or more electronic documents that are electronically reproducible by the processing device 104 and allow for the insertion of personalized or specific data therein.

In addition to the template 118, the processing device 104 also generates address data requests 120. The requests 120 are provided to the address data database for the retrieval of address data 122 therefrom. The address data 122 includes one or more address fields, where each field includes information about particular contacts, as discussed in further detail below.

In one embodiment, for each generated electronic document, the processing device 104 may execute the request 120 to extract another set of address data 122, in another embodiment, a batch of address data 122 may be extracted and temporarily stored in the processing device 104 until utilized for insertion into the document.

The processing device 104 inserts address fields of the address data 122 into the documents, wherein the formatting of the insertion is based on the address format command 114. If the address format command 114 indicates a mailing protocol, the address fields are to be assembled in accordance with the applicable governing postal protocol. In this embodiment, prior to the insertion of the address fields, an address field indicating a particular postal jurisdiction, e.g. country, is extracted. Based on this information, a protocol request 124 is provided to the mailing protocol database 106. The appropriate mailing format 126 is retrieved therefrom.

The protocols in the database 106 may include ISO 11180 protocols, World Postal Association contracts, World Postal Association International Address guidelines, and various national guidelines. It is also recognized that the processing device 104, for improved speed of operation, may not have to access the protocol database 106 for every address, but may access the database 106 when needed.

Therefore, if the address format command 114 indicates the mailing format, the address fields are inserted in the documents in accordance with the mailing protocol guidelines 126. Although, if the address format command 114 indicates a style format, the address fields are inserted into the electronic document in accordance with a style format. In one embodiment, the style format may be included within the template 118, providing an indication of where the address fields are supposed to be placed in the document.

In another embodiment, the style format may be stored in a separate database (not illustrated) and the format may be extracted when needed. For example, various style templates may be used in conjunction with different document templates 118, so a generated campaign may include selecting a particular template and a particular type of address styling format. In another embodiment, the style format may also be generated by an end user to accommodate the underlying documents, such as focusing on the receiver's job title when generating documents relating to the recipient's position.

Whether it is with the mailing format or the style format, the address fields of the address data are inserted into the electronic document by the processing device 104. This process is repeated any number of times until all the requested electronic documents have been generated. It is also recognized that further processing steps may be performed to the electronic documents for a greater level of personalization, such as inserting further personalized data regarding the recipient. For example, the recipient's name may be extracted and inserted into a "Dear" introduction to the document. In other example, if the document relates to a person's account, the document may have account information inserted therein.

Once the documents 128 are generated, they are provided to the output device 112. This device 112 may be a storage device that electronically stores the documents. The device 112 may also be a device for electronically transmitting the documents. The device 112 may be another processing system that performs further operations on the documents, such as adding them to other electronic documents. The processing device 104 thereupon generates the electronic documents by the automated insertion of formatted address information where that address information is formatted based the address format command 114 relating to either the selection of a mailing format or the selection of a style format.

Figure 2:
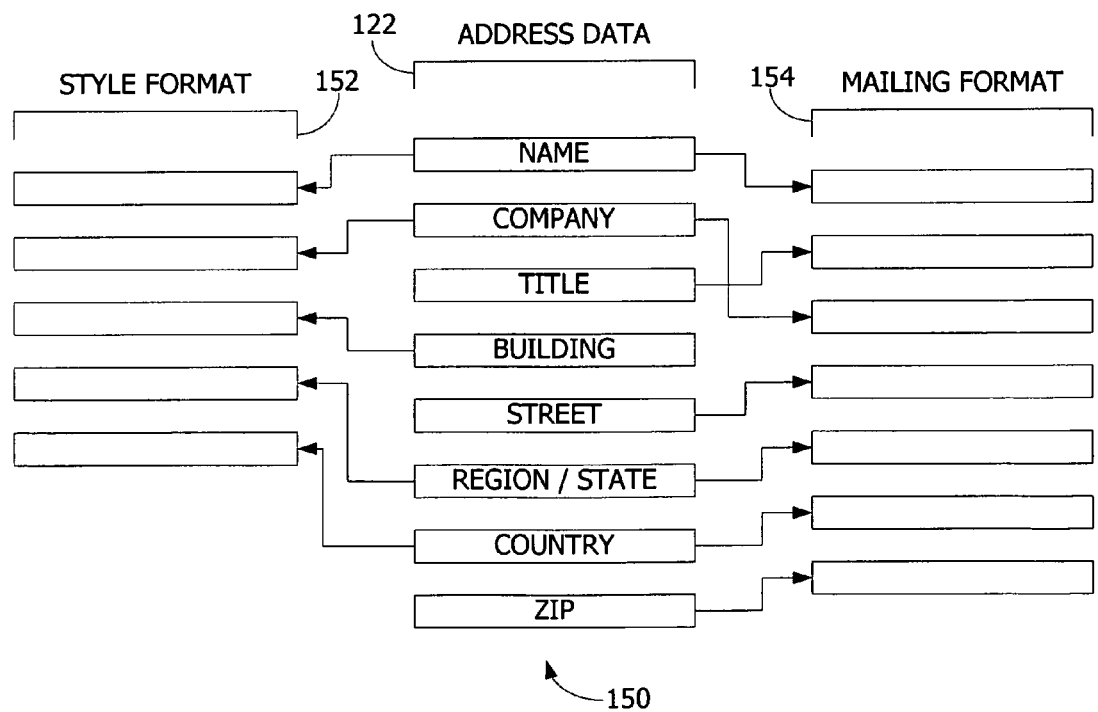
FIG. 2 illustrates a graphical representation of the placement of different address data fields based on an address format.

FIG. 2 illustrates a graphical representation of address fields 150 which may be included within the address data 120. For example, the address fields 150 may include a name field, a company field, a title field, a building or office indicator field, a street field, a region/state field, a country field, a zip code field and any other suitable fields. These fields may be stored in a computing system for use with the address data database 108 of FIG. 1 or may be disposed in other systems and assembled by the processing device 104 of FIG. 1 for insertion into the electronic documents.

Based on the designated formatting, whether it is a style format 152 or a mailing format 154, particular address fields 150 are selected and positioned accordingly. For example, in the style format 152, five (5) of the address fields are utilized for this exemplary style. The name, company, building, region/state and country are used to generate the stylized address. This style may not comply with the mailing protocols, but the documents themselves may not be being sent to the recipient via a postal delivery. Or, in another embodiment, the document may be sent via postal delivery but the stylized address may not be used for addressing the transmission, such as labels may be printed for an envelope where the labels would include proper mailing formatting.

In the other exemplary formatting of FIG. 2, the address data 120 may be assembled based on the mailing format 154. In this example, various address fields are used to generate an address field in accordance with a postal mailing format protocol. Illustrated in FIG. 2, the mailing format includes the name, the recipient's title, company name, street, region/state, country and zip code. It is also envisioned that there exists other address data fields that may be used in either the style format and/or mailing format as governed by either style parameters or mailing protocol parameters, as recognized by one having ordinary skill in the art.

Figure 3:
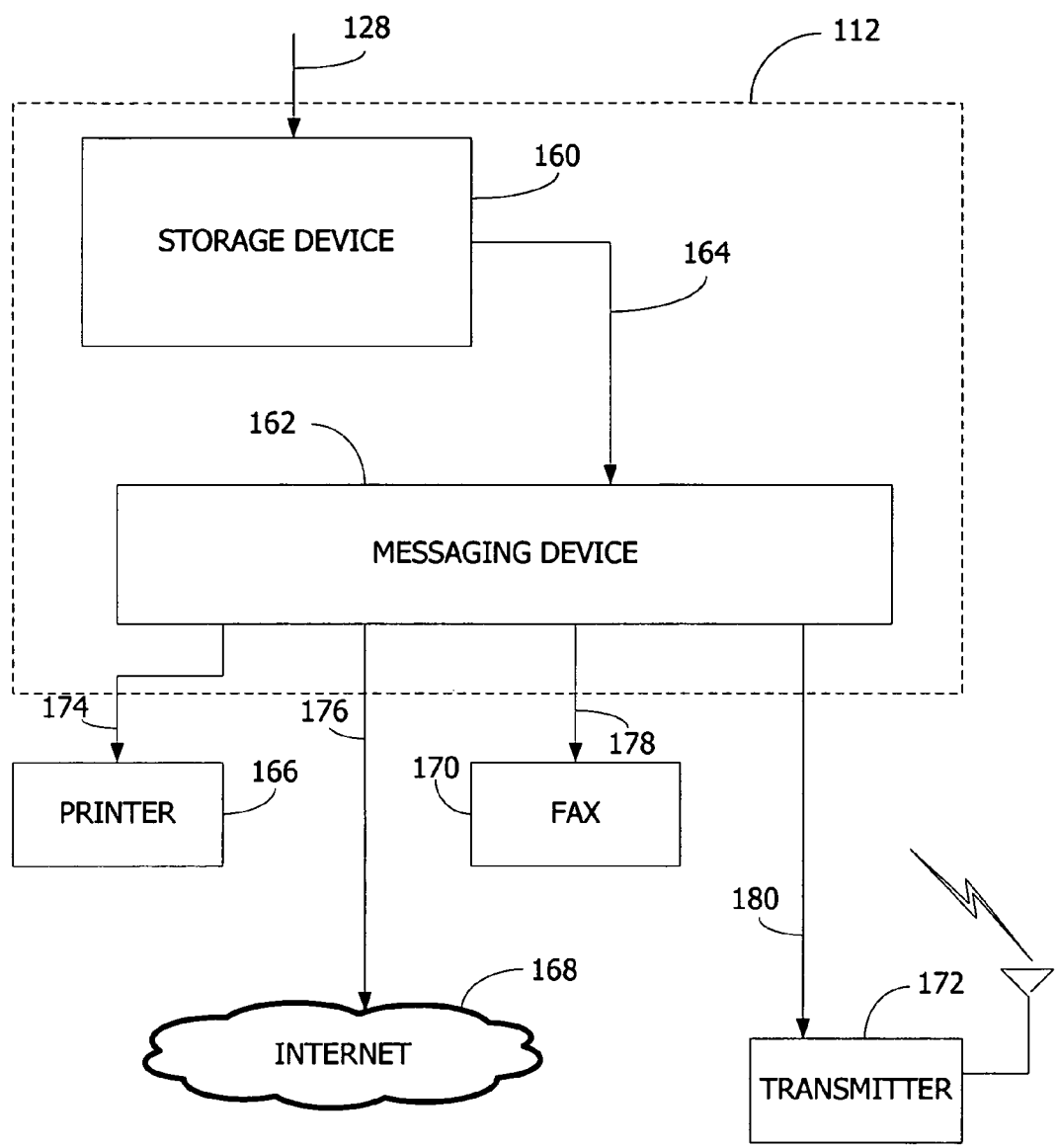
FIG. 3 illustrates a block diagram of one embodiment of various output techniques for the electronic documents.

FIG. 3 illustrates one embodiment of the output device 112 providing for the transmission of the different electronic documents, such as generated in FIG. 1. This embodiment of the output device 112 includes a storage device 160 and a messaging device 162. The storage device 160 electronically stores the electronic documents having the formatted address information therein. When the documents are to be transmitted, transmission commands 164 are provided to the messaging device, the commands including the electronic documents themselves. The commands 164 may include instructions for a particular type of transmission and the accompanying destination routing information.

Illustrated in FIG. 3, the messaging device 162 is coupled to various transmission means, such a printer 166, the internet 168, a facsimile machine 170 and a wireless transmitter 172. In various embodiments, the electronic documents may be transmitted using different techniques. A first technique may include a print command 174 to the printer 166 for physically printing the document as a hard copy. Depending on the address formatting used in generating the documents, these hard copies may be sent via postal delivery or may be included with other documents for postal delivery. In another embodiment, the printer 166 may provide for printing into an electronic document, such as creating a PDF document through a PDF publishing application available from Adobe.

Another available transmission technique is an electronic mail transmission. The message device 162 may convert the electronic document into an electronic mail transmission 176, including using an electronic mailing address that may be included in the command 164. Through the internet 168, the electronic mail transmission 176 is routed to the intended recipients, such as in one embodiment including the electronic document as an attachment or in another embodiment embedded in the mail itself.

Another available transmission technique is the sending of a facsimile 178 using the machine 170. The command 164 may include a fax number for directing the transmission to a recipient's facsimile machine. In another embodiment, the documents may be sent via a paging or messaging system, such as a wireless transmission 180 to a mobile device, through the wireless transmitter 172.

Figure 4:
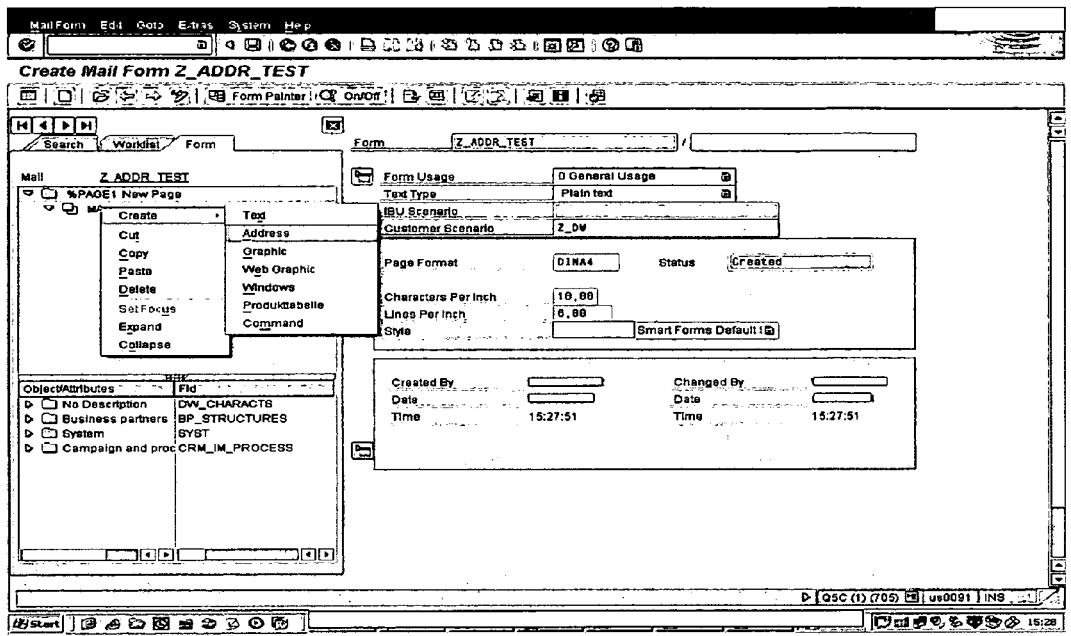
FIGS. 4 and 5 illustrates representative screen shots of an operating application providing for the automated insertion of formatted address information.
Figure 5:
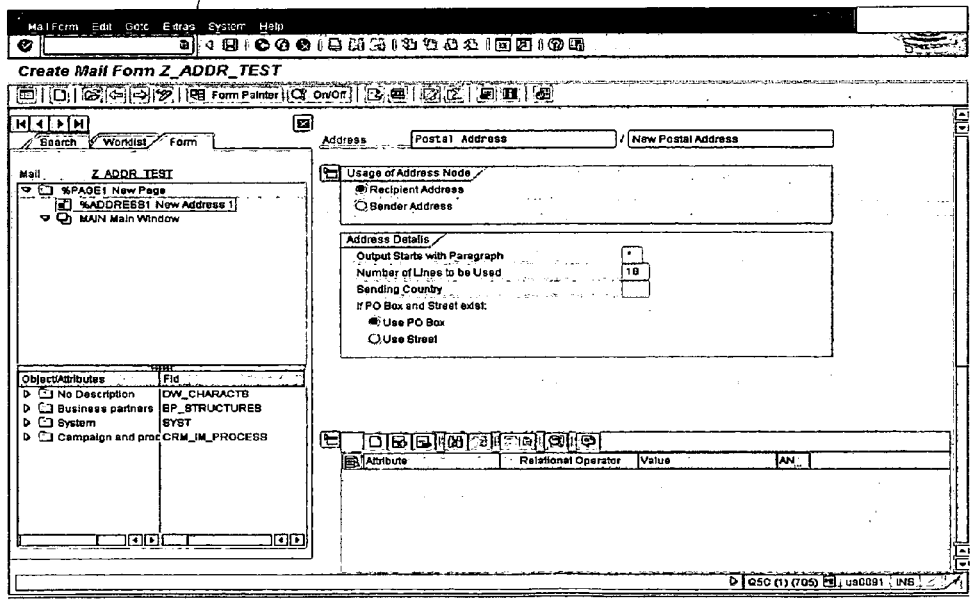

FIGS. 4 and 5 illustrate screen shots 190 and 192 of one exemplary embodiment of a software application providing for the generation of an address style format. The first screen shot 190 provides for the selection of pull down menus to select the creation of an address field. In a second portion of the display, various factors relating to the address may be determined. As illustrated in the screen shot 190, this address is associated with a particular form, such as used to generate the template into which further information may be inserted. In establishing a mass communication campaign, the approach may be used to provide initial set-up of the parameters relating to style formatting of address information.

The second screen shot 192 provides further display of information for establishing a template. Radio selected options are used in one embodiment to establish a formatting, such as in the screen shot 192 allowing a user to selected between mail style formatting relating to a sender's address or a recipient's address. Other factors may be address, such as dealing with post office boxes or other conditions typically found with different types of addresses. Through this interactive display, a user may establish a style format usable with one or more templates.

Figure 6:
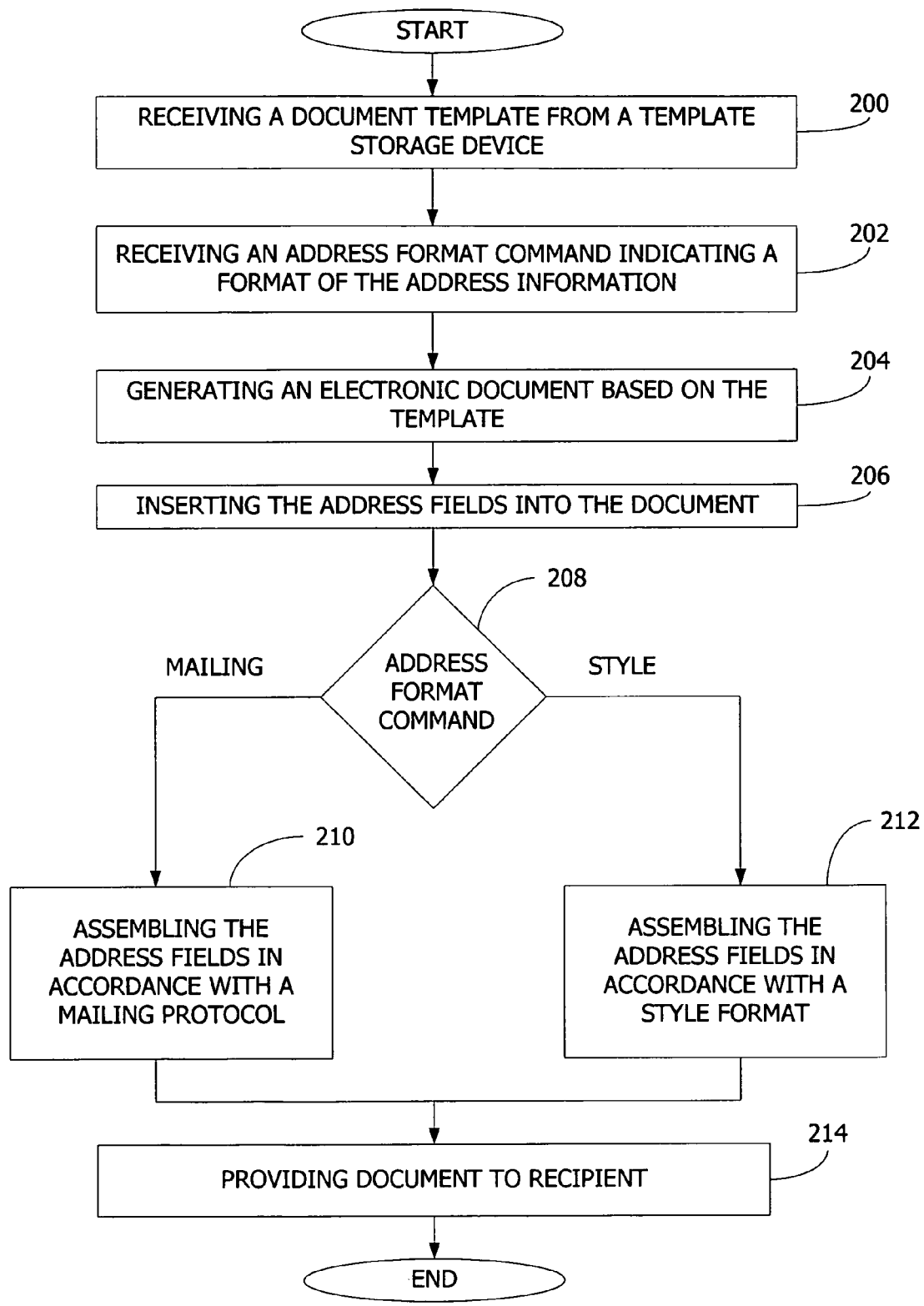
FIG. 6 illustrates a flowchart of the steps of one embodiment of a method for the automated insertion of formatted address information.

FIG. 6 illustrates a flowchart of the steps of one embodiment of a method the automated insertion of formatted address information in an electronically generated document. The method begins, step 200, with receiving a document template from a template storage device. As discussed above with respect to FIG. 1, the template 118 may be received from the template database 110.

The next step, step 202, is receiving an address format command that indicates a format of the address information. This formatting command, such as command 114 of FIG. 1, provides an indication if the address formatting is to follow a mailing format or a stylistic format. The next step, step 204, is generating an electronic document based on the template. This document may be generated by inserting information from various different sources, including address information, such as inserting address fields into the document, step 206.

During the insertion of the address fields, a determination is made if the address format command indicates a mailing protocol or a style format, step 208. If the command is a mailing format, the next step is assembling the address fields in accordance with a mailing protocol, step 210. As discussed above this step may be performed in accordance with mailing protocols 126. If the command is a style format, the next step is assembling the address fields in accordance with a style format, step 212. As discussed above, this may be based on a style format associated with a template, retrieved from a storage location, defined by a user or any other available stylistic formatting.

After step 210 or step 212, the method proceeds to step 214 which is providing the document to the recipient. As discussed above with respect to FIG. 3, this may be performed in one or more of several different techniques, including for example, postal delivery, electronic mail, facsimile and a wireless messaging system. It is also noted that steps 202, 206, 210 or 212 and 214 may be repeated numerous times in a standard operation as the method generates multiple electronic documents for distribution to various recipients. Thereupon, in one embodiment, the method is complete.

Through the receipt of an address format command, the processing device 104 is operative to assemble address fields in electronic documents in accordance with various approaches. If the document is destined for physical delivery through a postal system, the various postal jurisdiction protocols may be followed to generate the proper address. When the document is being electronically transmitted and business protocol dictates the inclusion of address information, but not necessarily exacting formatting following mailing protocols, the processing device may assemble the address fields based on a style format. Therefore, the electronic documents may be readily assembled using existing data from existing storage or resource management systems with the flexibility to adjust address formatting depending on a user's preference in the not only the layout of the document, but also the intended means of transmitting the document to its intended recipient.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

What is claimed is:

1. An apparatus for the automated insertion of formatted address information in an electronically generated document, the apparatus comprising:

an address storage device having a plurality of address fields stored therein;

a style format template database having a plurality of style formats stored therein;

a processing device coupled to a template storage device and the address storage device, the processing device operative to:

retrieve a document template from the template storage device;

generate an address data request to the address storage device, wherein address data is included in one or more address fields;

receive an address format command;

generate the electronic document based on the document template by importing the address fields including address data from the address storage device according to the generated address data request into the generated electronic document;

if the address format command indicates mailing format, assemble the address fields in the generated electronic document in accordance with a mailing protocol, else if the address format command indicates a style format that is non-compliant with a mailing format, extract a style format template from the style format template database and assemble the address fields in the generated electronic document in accordance with the style format that is non-compliant with the mailing format; and populate the address fields of the generated document with the imported address data.

2. The apparatus of claim 1 further comprising:
an input device operative to receive an input command indicating the address format command.

3. The apparatus of claim 1 further comprising:
an output device coupled to the processing device, the output device receiving the electronic document generated by the processing device.

4. The apparatus of claim 3 wherein the output device is a memory device for storing the electronic documents.

5. The apparatus of claim 1 further comprising:
a mailing protocol database including a plurality of mailing protocols such that the processing device is operative to communicate with the mailing protocol database so the address fields are in accordance with the mailing protocols.

6. The apparatus of claim 5 wherein the processing device extracts a postal jurisdiction identifier, the identifier used for selecting the mailing protocol.

7. The apparatus of claim 1 wherein the address field includes at least one of:
a name field, a title field, a company field, a street field, a city field, a region field and a postal identifier field.

8. The apparatus of claim 1, further comprising:
an electronic document template database including a plurality of electronic documents having embedded therein the style format indicating the location of address fields in the electronic document.

9. A method for the automated insertion of formatted address information in an electronically generated document, the method comprising:
retrieving a document template from a template storage device;
receiving an address format command indicating a format of address information;
generating an address data request to the address storage device, wherein address data is included in one or more address fields;
generating the electronic document based on the document template by importing the address fields including address data from the address storage device according to the generated address data request into the electronic document;
inserting a plurality of data elements from an address field into the generated electronic document;
formatting the address fields based on the address format command such that if the address format command indicates the mailing format, the address fields are assembled in the generated electronic document in accordance with a mailing protocol, else if the address format command indicates a style format that is non-compliant with a mailing format, extract a style format template that is non-compliant with the mailing protocol from a style format template database and the address fields are assembled in the electronic document in accordance with the non-compliant style format; and populating the address fields of the generated document with the imported address data.

10. The method of claim 9 further comprising:
receiving the address format command from an input device.

11. The method of claim 9 further comprising:
providing the electronically generated documents to an output device.

12. The method of claim 11 wherein the output device is a electronic transmission device, the method further comprising:
electronically transmitted each of the documents to its intended recipient.

13. The method of claim 11 wherein the output device is a memory device, the method further comprising:
electronically storing each of documents in the memory device.

14. The method of claim 9 further comprising:
if the address field is assembled in accordance with the mailing protocol, retrieving the mailing protocol from a mailing protocol database.

15. The method of claim 14 further comprising:
extracting a postal jurisdiction identifier from the address field; and
retrieving the mailing protocol based on the identifier.

16. The method of 9 wherein the address field includes at least one of:
a name field, a title field, a company field, a street field, a city field, a region field and a postal identifier field.

17. The method of claim 9, wherein the formatting further comprises:
assembling, by a processor, the address fields of the generated electronic document based on the style format, if the generated electronic document is to be transmitted electronically.

18. A processing system providing for the automated insertion of formatted address information in an electronically generated document, the processing system comprising:
an input device operative to receive an input command indicating an address format command;
an address storage device having a plurality of address fields stored therein;
a mailing protocol database including a plurality of mailing protocols stored therein;
a processing device coupled to a template storage device and the address storage device, the processing device operative to:
retrieve a document template from the template storage device;
receive an address format command;
generate an address data request to the address storage device, wherein address data is included in one or more address fields;
generate an electronic document based on the document template by importing the address fields including address data from the address storage device according to the generated address data request into the generated electronic document;
if the address format command indicates a mailing format, assemble the address fields in the generated electronic document in accordance with a mailing protocol in accordance with the mailing protocols;
if the address format command indicates a style format, extract a style format template that is non-compliant with the mailing protocol from a style format template database and assemble the address fields in the generated electronic document in accordance with the non-compliant style format; and populate the address fields of the generated document with the imported address data.

19. The processing system of claim 18 further comprising:

an output device coupled to the processing device, the output device receiving the electronic document generated by the processing device.

20. The processing system of claim 19 wherein the output device is a memory device for storing the electronic documents.

21. The processing system of claim 18 wherein the address field includes at least one of:

a name field, a title field, a company field, a street field, a city field, a region field and a postal identifier field.

* * * * *